United States Patent [19]

McIlwain et al.

[11] 4,407,110

[45] Oct. 4, 1983

[54] FRAME FOR CROP HARVESTING HEADER

[75] Inventors: Irwin D. McIlwain, Lancaster; Lawrence M. Halls, New Holland, both of Pa.

[73] Assignee: Sperry Corporation, New Holland, Pa.

[21] Appl. No.: 306,552

[22] Filed: Sep. 28, 1981

[51] Int. Cl.³ .............................................. A01D 55/32
[52] U.S. Cl. ...................................... 56/14.4; 56/15.3; 56/15.8
[58] Field of Search ........................ 56/10.2, 10.4, 12.7, 56/14.3, 14.4, 14.5, 15.3, 15.8, 208, 210, 320.1, 158

[56] References Cited

U.S. PATENT DOCUMENTS

| | | | |
|---|---|---|---|
| 2,599,438 | 6/1952 | Downing et al. | 56/158 |
| 2,795,922 | 6/1957 | Hume | 56/257 |
| 3,886,718 | 6/1975 | Talbot | 56/208 |
| 3,982,383 | 9/1976 | Mott | 56/208 |
| 4,011,709 | 3/1977 | Mott et al. | 56/10.4 |
| 4,091,602 | 5/1978 | Williams et al. | 56/14.4 |

Primary Examiner—Gene Mancene
Assistant Examiner—David I. Tarnoff
Attorney, Agent, or Firm—Larry W. Miller; Frank A. Seemar; Darrell F. Marquette

[57] ABSTRACT

A basic frame for a crop harvesting header which is attachable to a combine to sever standing crop and initiate the crop harvesting process is disclosed wherein the same frame can be utilized in the construction of both rigid and flexible headers. A connection member is provided for each attachment rib interconnecting the frame and the cutterbar, such that the attachment rib can be either pivotally connected to the frame to provide a flexible header or rigidly attached to the frame to provide a rigid header. Each connection member permits a rigidly attached rib to be vertically positionally adjusted to provide proper alignment of the cutterbar across the entire width of the header. The header frame includes a hat-shaped member corresponding to each of the connection members within which the attachment ribs can be nested.

18 Claims, 7 Drawing Figures

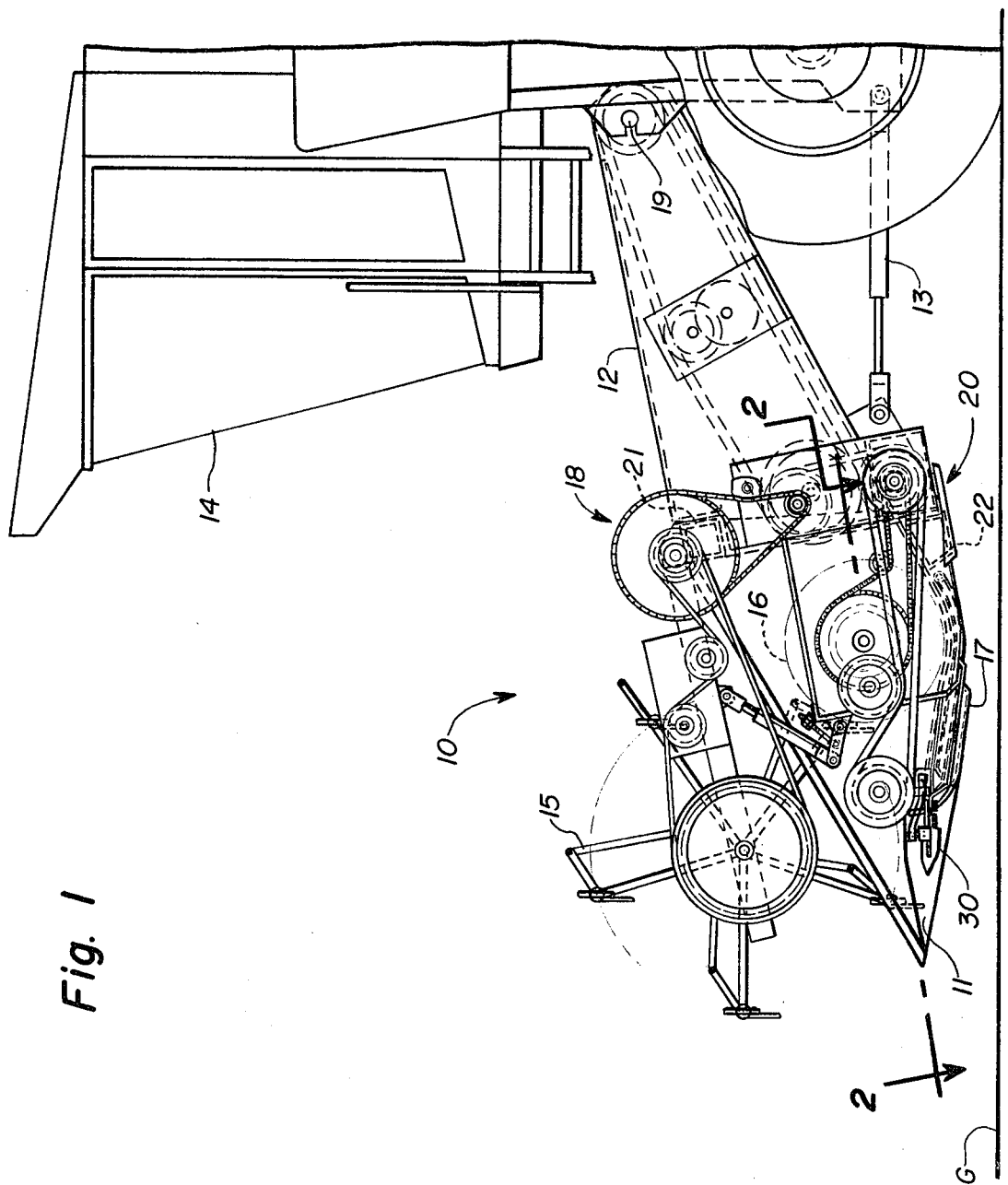

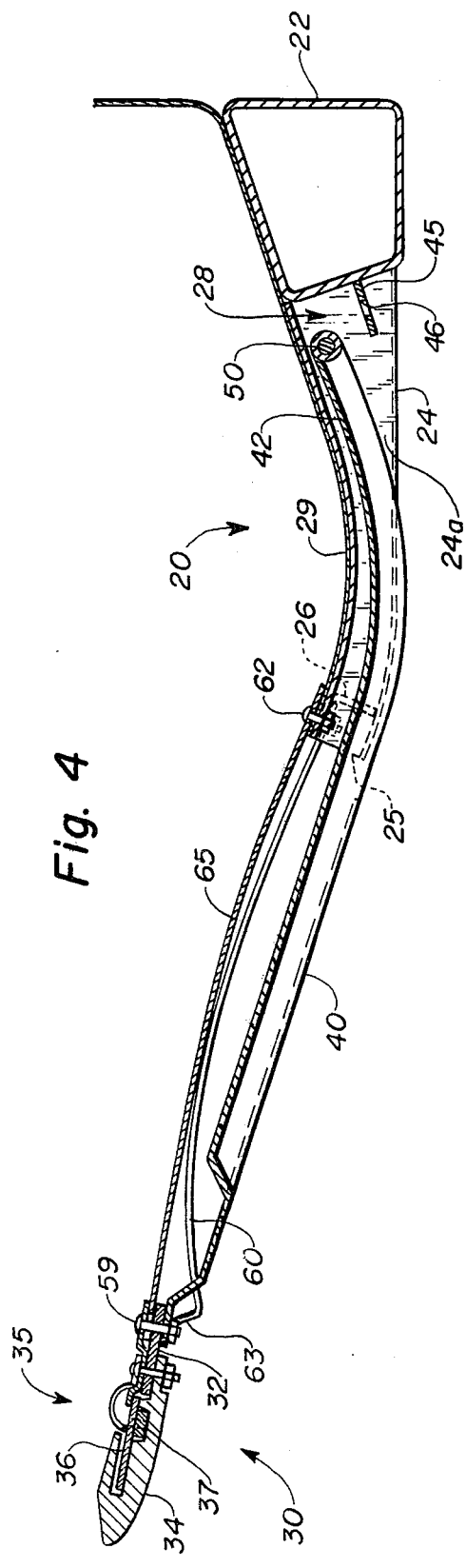
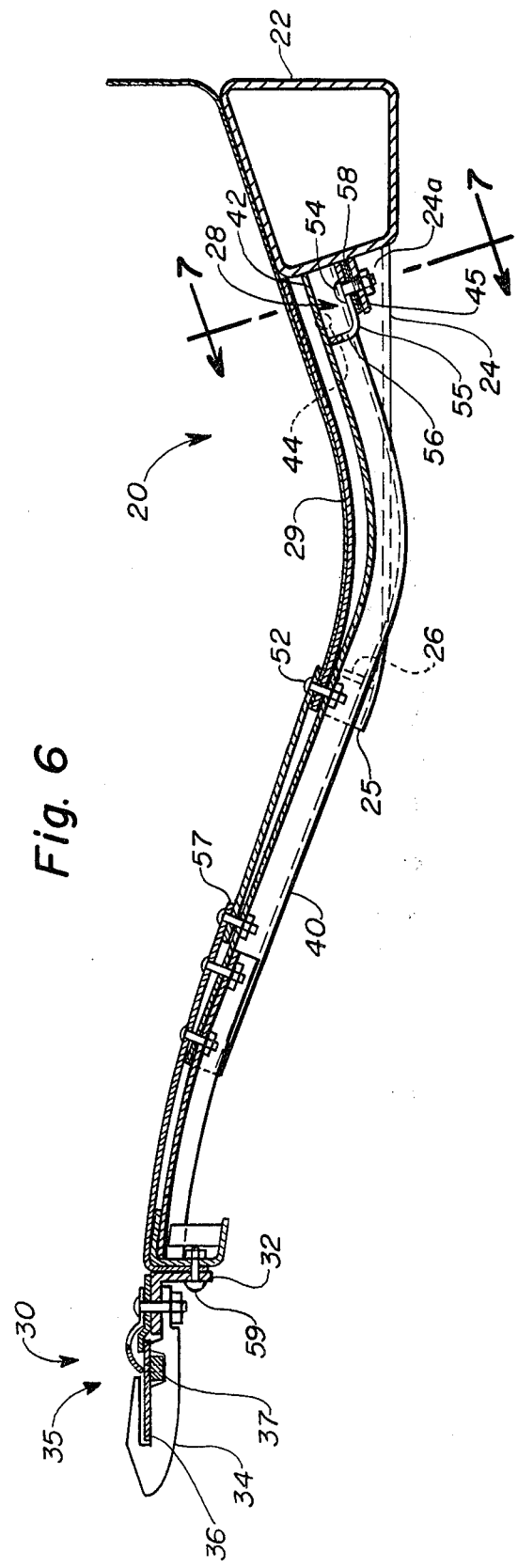
Fig. 4
Fig. 6

FRAME FOR CROP HARVESTING HEADER

BACKGROUND OF THE INVENTION

The present invention relates generally to crop harvesting headers attachable to combines and, more particularly, to a basic header frame to which the cutterbar can be rigidly or flexibly attached.

Grain headers, having a cutterbar at the forward portion thereof along the entire width of the header, are generally constructed as either a rigid header or a flexible header. In a rigid header, the cutterbar is attached to the header frame such that there is generally no relative movement therebetween. The flexible header is constructed in such a manner as to permit the cutterbar to flex vertically relative to the header frame. This construction permits the flexible header to harvest crops, such as soybeans, which grow close to the ground, since the cutterbar is capable of vertical movement to follow the variations of the ground surface.

Usually, the cutterbar is of the reciprocating variety and includes a primary support bar, possibly in the shape of a right angle for rigidity or a flat bar for flexibility, along the entire width of the header. Attachment ribs interconnect the support bar and the header frame to attach the cutterbar to the header and provide either a flexible or rigid support. Basically, the frame for rigid and flexible headers are not interchangeable, as provision has to be made for pivotally mounting the attachment ribs if a flexible header is being constructed or for rigidly connecting the ribs to the header frame if a rigid header is desired.

This lack of interchangeability between header frames results in the need for more tooling and in a generally inefficient use of manpower, equipment and supplies, whenever the construction of both rigid and flexible headers is desired. Furthermore, the ability to convert from a rigid header to a flexible header, or vice versa is greatly restricted.

SUMMARY OF THE INVENTION

It is an object of this invention to overcome the aforementioned disadvantages of prior art by providing a basic header frame for use in both rigid and flexible headers.

It is another object of this invention to provide a header frame with connection members to selectively permit the attachment ribs to be either rigidly attached or pivotally connected to the header frame.

It is a feature of this invention that both rigid and flexible headers can utilize the same basic header frame.

It is still another object of this invention to provide connection members that permit rigidly connected attachment ribs to be vertically positionally adjusted for proper alignment of the cutterbar along the width of the header.

It is another feature of this invention that a conversion of a flexible header to a rigid header can be more easily accomplished than has been heretofore known.

It is yet another object of this invention to provide a header frame that will facilitate the assemblage of the entire header, irrespective of whether the header is intended to be rigid or flexible.

It is a further object of this invention to provide a basic header frame for utilization in both rigid and flexible headers, which is durable in construction, inexpensive of manufacture, carefree of maintenance, facile in assemblage, and simple and effective in use.

These and other objects and features are accomplished according to the instant invention by providing a basic frame for a crop harvesting header which is attachable to a combine to sever standing crop and initiate the crop harvesting process, wherein the same frame can be utilized in the construction of both rigid and flexible headers. A connection member is provided for each attachment rib interconnecting the frame and the cutterbar, such that the attachment rib can be either pivotally connected to the frame to provide a flexible header or rigidly attached to the frame to provide a rigid header. Each connection member permits a rigidly attached rib to be vertically positionally adjusted to provide proper alignment of the cutterbar across the entire width of the header. The header frame includes a hat-shaped member corresponding to each of the connection members within which the attachment ribs can be nested.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a side elevational view of a flexible crop harvesting header, wherein the cutterbar is free to move a limited amount relative to the header frame, incorporating the principles of the instant invention;

FIG. 4 is a cross sectional view through the attachment rib of the flexible header seen in FIG. 2, taken along lines 4—4;

FIG. 6 is a cross sectional view through the attachment rib of the rigid header seen in FIG. 3 and taken along lines 6—6.

DETAILED DESCRIPTION OF THE PREFERRED EMBODIMENT

Figure 3:
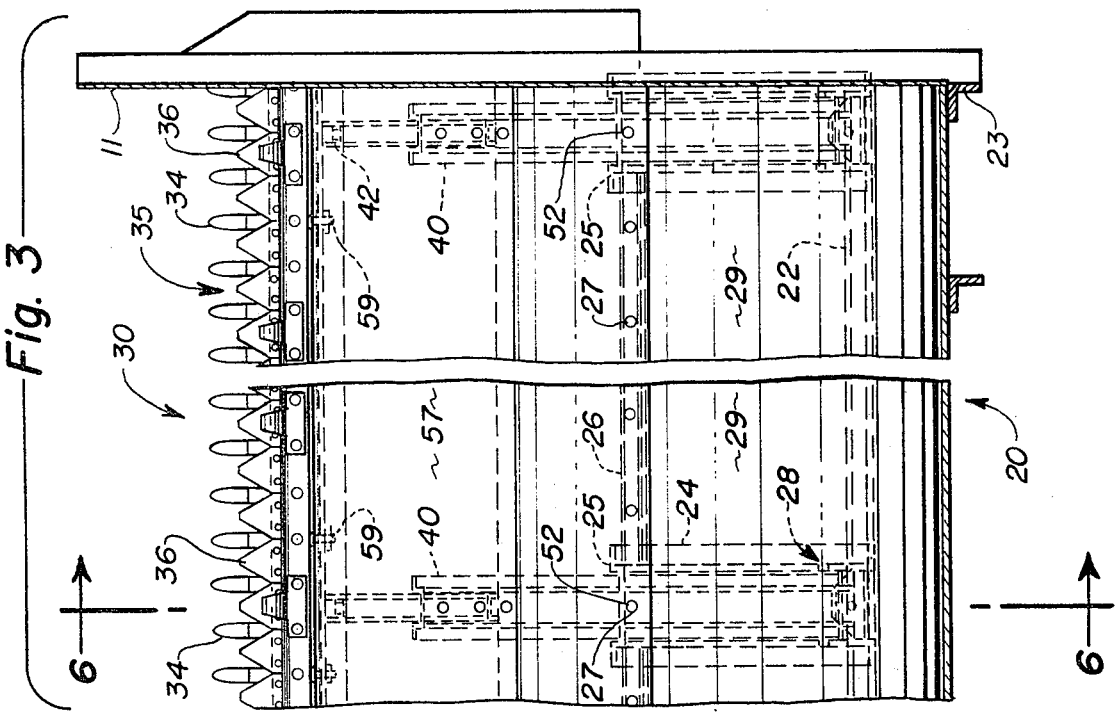
FIG. 3 is a partial cross sectional view of a crop harvesting header constructed so that the cutterbar is rigidly connected to the header frame, FIG. 3 corresponding to the view seen in FIG. 2, but showing the right side of a rigid header.

Referring now to the drawings and, particularly, to FIG. 1, a side elevational view of a flexible crop harvesting header, attached to a crop harvesting machine, commonly referred to as a combine, can be seen. Any left and right references are used as a matter of convenience and are determined by standing at the rear of the machine, facing the forward end, the direction of travel. The crop harvesting header 10 is shown attached to the feeder house structure 12 through which crop material is conveyed to the combine 14 for harvesting treatment. The header 10 includes spaced apart sidewalls 11 defining the width of the header, a reel 15 for conveying severed crop rearwardly, a transverse consolidating auger 16, which feeds the severed crop to the feeder house 12, and drive mechanism 18 for powering the reel 15, the auger 16 and a reciprocating cutterbar 30. The operation and purpose of these components is well known in the art and need not be further discussed. By manipulation of the hydraulic cylinders 13, the header 10 and attached feeder house 12 can pivot about the connection point 19 to raise or lower the header 10 relative to the ground G. The normal operation of a flexible header 10, as seen in FIG. 1, is generally with the skid plate 7 contacting the ground G to keep the cutterbar 30 as close to the ground as possible.

BASIC HEADER FRAME

Figure 2:
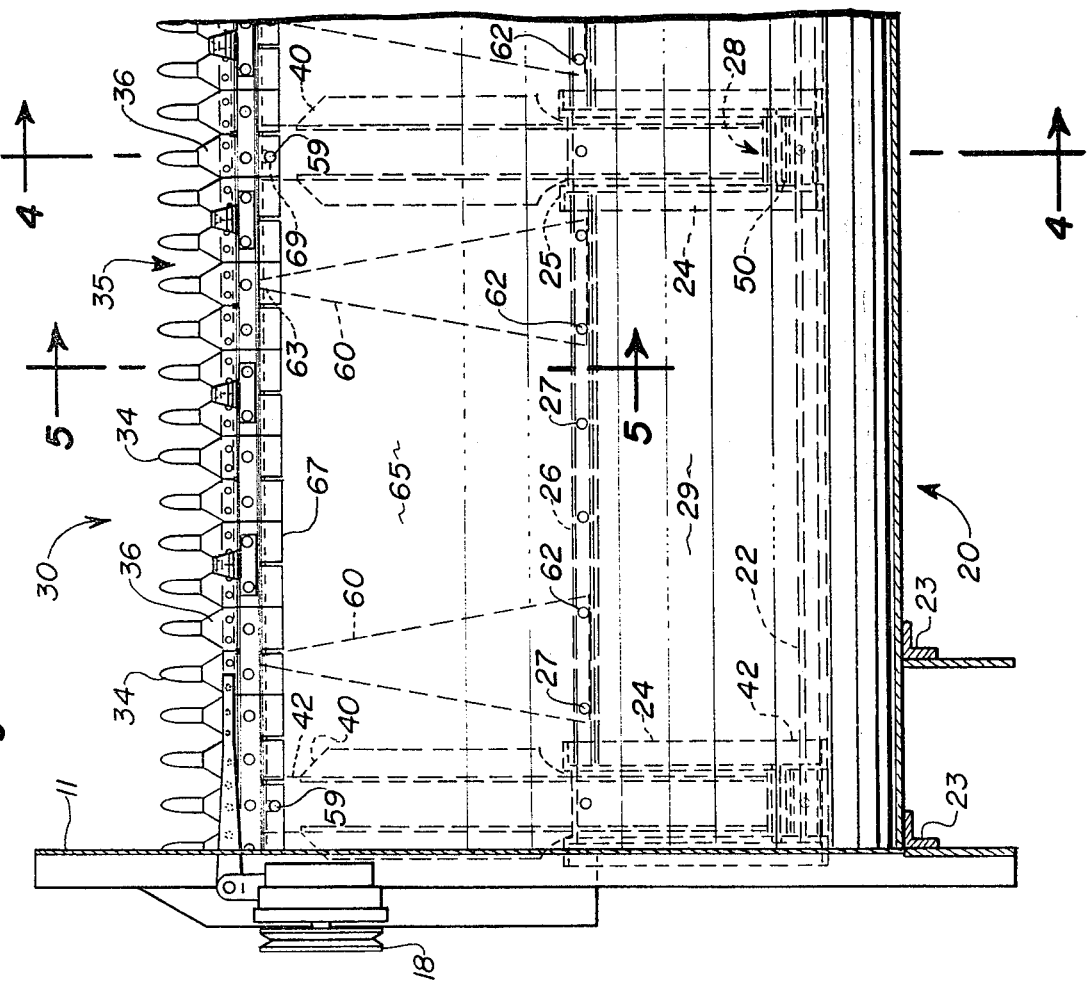
FIG. 2 is a partial cross sectional view of the flexible header seen in FIG. 1 taken along lines 2—2, showing the left side of the header.

Referring now to FIGS. 1, 2, 3, 4 and 6, the basic header frame 20 for use in constructing both a flexible and a rigid header can be seen. The frame 20 includes an upper transverse main beam 21, which is used to support the header 10 on the feeder house 12, and a lower transverse beam 22, which is connected to the upper beam 21 by a series of vertical members 23, such as seen in FIG. 2 as right angles. A plurality of hat-shaped channel members 24 are fixed to the lower transverse beam 22 and extend forwardly therefrom. These spaced apart channel members 24 are interconnected at their forwardmost end 25 by a transversely disposed front connection member 26, shown in the drawings in the form of a right angle member, which has a plurality of holes 27 spaced along the length thereof. Each hat-shaped channel member 24 includes a pair of spaced apart, generally vertical flange portions 24a and houses a rearward connection area 28 therebetween and adjacent the lower transverse beam 22. The hat-shaped channel members 24 and the lower transverse beam 22 support a rearward curved floor member 29, forming a trough in which the auger 16 operates.

A cutterbar 30 is mounted at the forward end of the header 10 to sever standing crop material and, thereby, initiate the crop harvesting process. The cutterbar 30 includes a primary support bar 32 positioned transverse to the direction of travel. A plurality of knife guards 34 are connected to the primary support bar 32 across the width of the header 10. A sickle assembly 35, comprised of a plurality of triangularly shaped knives 36 attached to an elongated knife back 37, is supported by the knife guards 34 for reciprocatory motion induced by the drive mechanism 18. The sickle assembly 35 cooperating with the knife guards 34 creates a shearing action for severing standing crop material.

Figure 7:
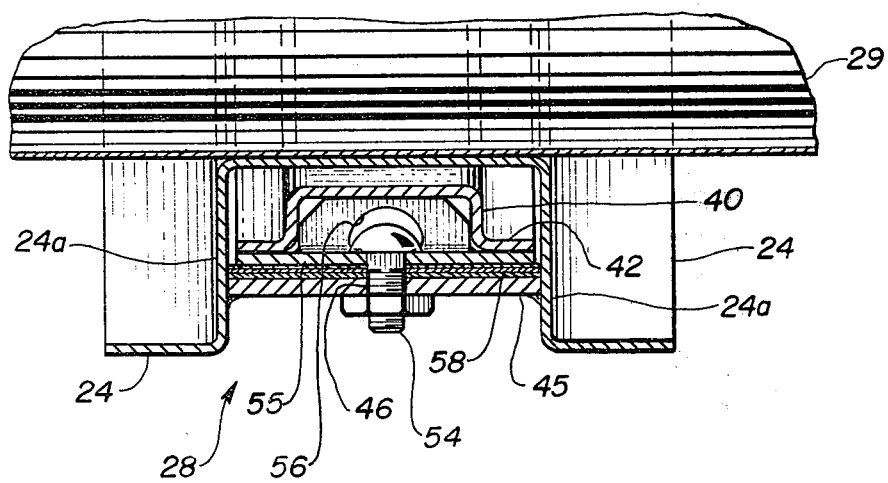
FIG. 7 is a cross sectional view through the header frame seen in FIG. 6, taken along lines 7—7 and showing the manner in which the attachment ribs of a rigid header are connected to the header frame.

The cutterbar 30 is connected to the header frame 20 by a series of attachment ribs 40 spaced along the width of the header 10. Each attachment rib 40 is fixedly connected to the primary support bar 32 of the cutterbar 30 by bolts 59 and either rigidly or pivotally connected to the hat-shaped channel members 24 at the rearward connection area 28, depending upon whether a flexible or rigid header is to be constructed. The attachment ribs 40 are also hat-shaped in cross section, but are smaller in size than the hat-shaped channel members 24, so that an attachment rib 40 can nest within the hat-shaped channel member 24, as can be best seen in FIG. 7. The rearward connection area 28 of each channel member 24 includes a transverse hole 44 through the channel member 24 and a plate 45 welded between the sides of the channel member 24 against the lower transverse beam 22. As can be seen in FIGS. 4, 6 and 7, the plate 45 has a generally vertical hole 46 therethrough.

If a flexible header 10, one in which the cutterbar 30 is free to flex vertically relative to the header frame 20, is to be constructed, the attachment rib 40 is connected to the rearward connection area 28 of the hat-shaped channel member 24 via a pivot pin 50 inserted through the transverse holes 44 in the channel 24. Although the construction of the flexible header 10 will be defined in greater detail below, the pivotal mounting of the attachment rib 40 to the channel member 24 permits the cutterbar 30 to move vertically relative to the header frame 20. Since each attachment rib 40 is permitted to pivotally move independently of all other attachment ribs 40, the cutterbar 30 is free to flex in a generally vertical direction to follow varying undulations in the ground surface. Leaf spring members 60, which provide a counterbalancing force to the weight of the cutterbar 30 as will be described in detail below, can be attached to the front connection member 26 by means of bolts 62 through the spaced apart holes 27 therein.

If a rigid header 10, one in which the cutterbar 30 is rigidly connected to the frame 20, is to be constructed, the attachment ribs 40 are connected to the front connection member 26 via bolts 52, extending through the holes 27 therein, and to the plate 45 via a bolt 54, extending through the hole 46 therein. As is best seen in FIGS. 6 and 7, the rearward end 42 of each attachment rib 40 is provided with an L-shaped bracket 55 for use in connecting the rib 40 to the plate 45. The bracket 55 includes a T-shaped slot 56 therein through which the bolt 54 can pass to reach the hole 46 in the plate 45. Since the L-shaped bracket 55 is welded to the rearward end 42 of each rib 40, the rigid connection of the attachment rib 40 to both the plate 45 and the front connection member 26 rigidly connects the cutterbar 30 to the header frame 20 to prevent any substantial relative movement therebetween. The utilization of shims 58 between the L-shaped bracket 55 and the plae 45 enables the attachment rib 40 to be pivoted a limited amount about the connection of the rib 40 with the front connection member 26. As a result, a manipulation of the number of shims 58 to be inserted between the L-shaped bracket 55 and the plate 45 provides for a vertical positional adjustment of the primary support bar 32 of the cutterbar 30, so that the guards 34 can be properly aligned along the width of the header 10 for proper operation of the sickle assembly 35 therewithin. The forward floor member 57 in the rigid header 10, coupled with the rearward floor member 29, provides a continuous surface over which crop can be conveyed to the feeder house 12.

It should be realized by one skilled in the art that FIGS. 2 and 3 depict alternative shapes and designs of attachment ribs 40. It should also be realized by one skilled in the art that the primary support bar 32 in the cutterbar 30 can have different shaped, as can be seen in a comparison of FIGS. 4 and 6. The support bar 32 in FIG. 4 is an elongated, relatively flat bar which would permit a limited amount of vertical flexing, whereas the support bar 32 in FIG. 6 is comprised of a right angle member which would lend rigidity to the cutterbar 30. Furthermore, it should be readily realized that the use of the same basic header rame 20 for the construction of both a flexible and a rigid header minimizes the amount of tooling necessary when both flexible and rigid headers are to be constructed, as well as maximizes the efficient use of manpower, equipment and supplies.

FLEXIBLE HEADER

Referring now to FIGS. 1, 2, 4 and 5, the flexible crop harvesting header can be seen. As noted above, the cutterbar 30 is connected to the basic header frame 20 by an attachment rib 40 pivotally connected by pivot 50 through the rearward connection area 28 of each hat-shaped channel member 24. Bolts 59 connect each attachment rib 40 to the primary support bar 32 of the cutterbar 30. The utilization of an elongated relatively flat support bar 32 permits the cutterbar 30 to be capable of flexing along the entire width of the header 10.

Because the flexible header 10 generally rides on the ground during operation thereof, it is desirable to minimize the weight of the header actually resting on the ground and thereby minimize the possibility of damage to the cutterbar 30, as well as maximize the floating characteristics of the cutterbar 30 to enable it to closely follow the variations in the ground surface. To accomplish this, a series of spaced apart leaf spring members 60 are positioned to provide a counterbalancing force to the weight of the cutterbar 30.

Each leaf spring member 60 is connected to the front connection member 26 of the basic header frame 20 by bolts 62 and projects forwardly thereof in an arched path before terminating at its forward end 63 underneath the primary support bar 32 of the cutterbar 30. As such, the leaf spring member 60 provides an uplifting spring force to the cutterbar 30 to reduce the weight thereof on the ground surface.

To span the gap between the cutterbar 30 and the curved floor 29 over the header frame 20, a forward floor member 65 is connected to the header frame 20 by bolts 62, which connect the forward floor member 65 to both the front connection member 26 and the forward-most end 25 of the channel members 24, and projects forwardly therefrom to the cutterbar 30. Because the cutterbar 30 is free to flex vertically about the pivotal axis 50, the forward floor member 65 is slidingly received between the primary support bar 32 and an elongated cutterbar wear strip 67. As seen in FIG. 2, the forward floor member 65 can be provided with a series of slots 69 to prevent interference with the bolts 59 connecting the attachment ribs 40 to the primary support bar 32. A more detailed description of the cutterbar wear strip 67 can be found in co-pending U.S. Ser. No. 203,173.

Figure 5:
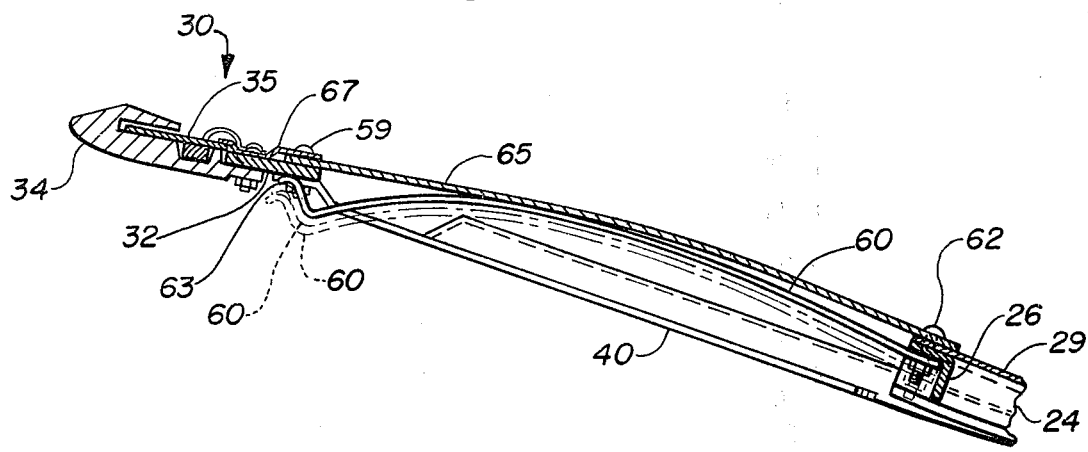
FIG. 5 is a partial cross sectional view of the flexible header seen in FIG. 2, taken along lines 5—5 and showing a leaf spring member, additional leaf spring members that can be optionally added at the same location being shown in phantom.

As can best be seen in FIGS. 4 and 5, the curved configuration of the leaf spring member 60 provides support for the forward floor members 65 intermediate the cutterbar 30 and the header frame 20. Accordingly, the forward floor member 65 can be constructed of an inexpensive, relatively thin strip of sheet metal. The combination of the cutterbar wear strip 67, forward floor member 65 and rearward curved floor member 29 provides a continuous surface over which severed crop material can be guided by both the reel 15 or the auger 16 without significant amount of crop loss.

As can be seen in FIGS. 2 and 5, increasing or decreasing amounts of counterbalancing force supplied to the cutterbar 30 can be accomplished by adding or subtracting leaf spring members 60. Since the leaf spring members 60 are connected to the header frame 20 beneath the front connection member 26, a number of leaf spring members 60 can be stacked vertically at each mounting location on the front connection member 26, as is seen in phantom in FIG. 5. Alternatively, the holes 27 in the front connection member 26 provide for a number of mounting locations for the leaf spring members 60 across the width of the header 10, therefore, a manipulation of the number of leaf spring members 60 spaced horizontally across the width of the header 10 can result in a selective varying of the weight of the header resting upon the ground. Obviously, a greater number of springs utilized would result in a lighter cutterbar with respect to the weight resting upon the ground. By using either method, or a combination of both of the methods, noted above, the amount of counterbalancing force supplied to the cutterbar 30 can be selectively varied.

It will be understood that changes in the details, material, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form shown.

Having thus described the invention, what is claimed is:

1. In a crop harveting header adapted to be connected to a crop harvesting machine for severing standing crop material and conveying the severed crop material to the crop harvesting machine for further harvesting treatment, said header having a transverse frame; two forwardly extending, spaced apart sidewalls defining the width of said header; a transverse cutterbar extending between said sidewalls for severing standing crop material, said cutterbar being positioned forwardly of said frame; a plurality of attachment ribs transversely spaced between said sidewalls, said ribs being connected at opposing ends to said cutterbar and to said frame to provide support for said cutterbar along the width of said header; and a floor member extending rearwardly from said cutterbar above said support ribs along substantially the entire width of said header, an improved transverse frame comprising:

an upper transverse main beam;

a lower transverse main beam affixed to and positioned below said upper beam;

a plurality of fore-and-aft extending channel members, each said channel member corresponding to one of said attachment ribs and having a rearward end affixed to said lower beam, a forward end spaced forwardly of said rearward end and terminating between said cutterbar and said lower beam, and two spaced apart, generally vertical flange portions adjacent said rearward end, each said channel member housing a connection area adjacent said lower beam, each said connection area including pivot connection means for pivotally attaching corresponding attachment ribs to form a crop harvesting header in which the cutterbar is vertically movable relative to said frame and the floor member will flex with the cutterbar and rigid connection means for rigidly connecting corresponding attachment ribs to form a crop harvesting header having a non-flexible cutterbar and floor member such that said cutterbar is not vertically movable relative to said frame, each corresponding said attachment rib being attachable to one of said pivot connection means and said rigid connection means for selectively constructing said header; and front transverse connection members interconnecting the forward end of adjacent channel members.

2. The header of claim 1 wherein said attachment ribs are pivotally connected to said corresponding channel members via said pivot connection means to permit said cutterbar to flex vertically relative to said header frame about said pivot means.

3. The header of claim 2 wherein each said front connection member includes a plurality of spaced apart holes therein, said header including leaf spring members connected to said front connection members and terminating beneath said cutterbar to provide a counterbalancing force to said cutterbar along the width of said header.

4. The header of claim 1 wherein said attachment ribs are rigidly connected to said corresponding channel members via said rigid connection means, such that said cutterbar is rigidly connected to said header frame.

5. The header of claim 4 wherein the forward end of each said channel member includes a hole therein, each said corresponding attachment rib being connected to the forward end of said channel member to rigidly connect said attachment rib to said header frame so that there is no relative movement between said cutterbar and said frame.

6. The header of claim 3 or 5 wherein each said pivot connection means includes an aperature in each respective said vertical flange portion, said aperatures being aligned along a common axis, so that the corresponding attachment ribs can be pivotally connected to the respective said channel members and supported by said vertical flange portions.

7. The header of claim 6 wherein each said rigid connection means includes a plate affixed to the respective said channel member between said vertical flange portions, said plate having an opening therein for the passage of fastening means for rigidly fastening the corresponding attachment rib thereto.

8. The header of claim 7 where said plate is also affixed to said lower transverse beam.

9. The header of claim 7 wherein said attachment ribs have a cross sectional configuration including two spaced apart, generally vertical flange portions.

10. The header of claim 9 wherein any of said attachment ribs being rigidly connected to said plate includes an L-shaped bracket affixed to such attachment rib between said vertical flange portions, said L-shaped bracket being positioned so as to have a portion thereof substantially parallel to said plate.

11. The header of claim 10 wherein a selective utilization of shims between said plate and said L-shaped bracket, under conditions where said attachment rib is to be rigidly connected to both said plate and said forward end of said corresponding channel member, positionally adjusts said cutterbar for proper alignment thereof across the width of said header.

12. The header of claim 11 wherein said channel members and said attachment ribs have hat-shaped cross sectional configurations, said attachment ribs being smaller in size than said channel members, such that each respective said attachment rib can nest within the corresponding said channel member.

13. The header of claim 9 wherein said L-shaped bracket includes a T-shaped slot therein for the passage of fastening means for the fastening of said L-shaped bracket to said plate.

14. A frame for a crop harvesting header attachable to a combine to sever standing crop material and convey the severed crop material rearwardly to the combine for further harvesting treatment, said header including a floor over which crop material may pass and a cutterbar mounted forwardly of said floor for severing the standing crop material, said cutterbar being supported forwardly of said frame by a plurality of attachment ribs interconnecting said cutterbar and said frame, comprising:

an upper transverse beam;
a lower transverse beam affixed to said upper beam and positioned below said upper beam;
a plurality of fore-and-aft extending channel members, each said channel member having a forward end affixed to said lower beam and a forward end spaced forwardly of said lower beam and terminating between said cutterbar and said lower beam, and two space apart, generally vertical flange portions adjacent said rearward end, each said channel member housing a connection area positioned between said vertical flange portions adjacent said lower beam, each said connection area including pivot connection means for pivotally connecting a corresponding attachment rib to form a crop harvesting header in which the cutterbar is vertically movable relative to said frame and the floor member will flex with the cutterbar and rigid connection means for rigidly connecting a corresponding attachment rib to form a crop harvesting header have a non-flexible cutterbar and floor member such that said cutterbar is not vertically movable relative to said frame, each said channel member corresponding to one of said attachment ribs which are selectively connectable to one of the corresponding said pivot connection means and said rigid connection means; and
transverse connection members interconnecting the forward end of adjacent said channel members, said connection members having a plurality of spaced apart holes therein.

15. A header frame of claim 14 wherein said pivot connection means includes an aperature in each vertical flange portion of each respective said channel member, which are aligned such that an attachment rib can be pivotally supported therebetween.

16. The header frame of claim 14 wherein said rigid connection means includes a plate affixed to both said vertical flange portions of each said channel member.

17. The header frame of claim 16 wherein each said attachment rib is rigidly connectable to the forward end of the corresponding said channel member to positionally fix said cutterbar relative to said frame.

18. The header frame of claim 17 wherein said channel members support a floor extending rearwardly from said forward end to a position above said lower beam.

* * * * *